(12) United States Patent
Badjatiya et al.

(10) Patent No.: US 11,720,651 B2
(45) Date of Patent: Aug. 8, 2023

(54) TEXT-CONDITIONED IMAGE SEARCH BASED ON TRANSFORMATION, AGGREGATION, AND COMPOSITION OF VISIO-LINGUISTIC FEATURES

(71) Applicant: Adobe Inc., San Jose, CA (US)

(72) Inventors: Pinkesh Badjatiya, Ujain (IN); Surgan Jandial, Jammu (IN); Pranit Chawla, Delhi (IN); Mausoom Sarkar, New Delhi (IN); Ayush Chopra, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 326 days.

(21) Appl. No.: 17/160,893

(22) Filed: Jan. 28, 2021

(65) Prior Publication Data
US 2022/0245391 A1    Aug. 4, 2022

(51) Int. Cl.
| | |
|---|---|
| G06F 18/25 | (2023.01) |
| G06N 3/04 | (2023.01) |
| G06F 16/583 | (2019.01) |
| G06F 16/532 | (2019.01) |
| G06F 16/538 | (2019.01) |
| G06F 18/214 | (2023.01) |

(52) U.S. Cl.
CPC .......... *G06F 18/253* (2023.01); *G06F 16/532* (2019.01); *G06F 16/538* (2019.01); *G06F 16/5846* (2019.01); *G06F 18/214* (2023.01); *G06F 18/251* (2023.01); *G06N 3/04* (2013.01)

(58) Field of Classification Search
USPC ................................ 382/306, 305, 181, 156
See application file for complete search history.

(56) References Cited

U.S. PATENT DOCUMENTS

| | | |
|---|---|---|
| 10,685,057 B1 | 6/2020 | Chavez et al. |
| 2018/0329996 A1 | 11/2018 | Perkins et al. |
| 2020/0356592 A1 | 11/2020 | Yada et al. |

(Continued)

OTHER PUBLICATIONS

U.S. Appl. No. 17/160,862, (filed Jan. 28, 2021) (45 pages).

(Continued)

*Primary Examiner* — Kathleen Y Dulaney
(74) *Attorney, Agent, or Firm* — Finch & Maloney PLLC

(57) ABSTRACT

Techniques are disclosed for text-conditioned image searching. A methodology implementing the techniques includes decomposing a source image into visual feature vectors associated with different levels of granularity. The method also includes decomposing a text query (defining a target image attribute) into feature vectors associated with different levels of granularity including a global text feature vector. The method further includes generating image-text embeddings based on the visual feature vectors and the text feature vectors to encode information from visual and textual features. The method further includes composing a visio-linguistic representation based on a hierarchical aggregation of the image-text embeddings to encode visual and textual information at multiple levels of granularity. The method further includes identifying a target image that includes the visio-linguistic representation and the global text feature vector, so that the target image relates to the target image attribute, and providing the target image as an image search result.

20 Claims, 11 Drawing Sheets
(2 of 11 Drawing Sheet(s) Filed in Color)

(56) References Cited

U.S. PATENT DOCUMENTS

| | | | |
|---|---|---|---|
| 2021/0124976 A1* | 4/2021 | Kim | G06V 10/82 |
| 2021/0256365 A1* | 8/2021 | Wang | G06F 16/583 |
| 2022/0084677 A1* | 3/2022 | Gupta | G06V 10/82 |

OTHER PUBLICATIONS

AK, et al., "Learning Attribute Representations with Localization for Flexible Fashion Search," IEEE/CVF Conference an Computer Vision and Pattern Recognition, 2018. pp. 7708-7717.

Antol, et al., "VQA: Visual Question Answering," IEEE International Conference on Computer Vision (ICCV), 2015. pp. 2425-2433.

Barman, A. and Shah, S.K, "A Graph-based Approach for Making Consensus-based Decisions in Image Search and Person Re-identification," IEEE Transactions on Pattern Analysis and Machine Intelligence, 2019. pp. 1-12.

Chen, et al., "Image Search with Text Feedback by Visiolinguistic Attention Learning," IEEE/CVF Conference on Computer Vision and Pattern Recognition, 2020. pp. 3001-3011.

Cho, et al., "Learning Phrase Representations using RNN Encoder-Decoder for Statistical Machine Translation," Proceedings of the Conference on Empirical Methods in Natural Language Processing (EMNLP), Sep. 3, 2014. 15 pages.

Chopra, et al., "Powering Robust Fashion Retrieval With Information Rich Feature Embeddings," Proceedings of the IEEE/CVF Conference on Computer Vision and Pattern Recognition (CVPR) Workshops, 2019. 9 pages.

Dutta, T. and Biswas, S., "s-SBIR: Style Augmented Sketch based Image Retrieval," Proceedings of the IEEE/CVF Winter Conference on Applications of Computer Vision (WACV), 2020. pp. 3261-3270.

Fu, et al., "Dual attention network for scene segmentation," Proceedings of the IEEE Conference on Computer Vision and Pattern Recognition, 2019. pp. 3146-3154.

Gao, et al., "Dynamic Fusion With Intra- and Inter-Modality Attention Flow for Visual Question Answering," Proceedings of the IEEE Conference on Computer Vision and Pattern Recognition (CVPR), 2019. pp. 6639-6648.

Guo, et al., "Dialog-based Interactive Image Retrieval," 32 Conference on Neural Information Processing Systems (NeurIPS), 2018. 11 pages.

Halawani, et al., "Fundamentals and Applications of Image Retrieval: An Overview," Datenbank-Spektrum, vol. 18, 2006 pp. 14-23.

Lecun, et al., "Deep Learning," Nature, vol. 521, May 28, 2015. pp. 436-444.

Lee, et al., "Stacked cross attention for image-text matching," Proceedings of the European Conference on Computer Vision (ECCV), 2018. 16 pages.

Mai, et al., "Spatial-Semantic Image Search by Visual Feature Synthesis," IEEE Conference on Computer Vision and Pattern Recognition (CVPR), 2017. pp. 4718-4727.

Patro, B. and Namboodiri, V.P., "Differential Attention for Visual Question Answering," IEEE Conference on Computer Vision and Pattern Recognition (CVPR), 2018. pp. 7680-7688.

Radenovic, et al., "Fine-Tuning CNN Image Retrieval with No Human Annotation," IEEE Transactions on Pattern Analysis and Machine Intelligence Jul. 10, 2018. 14 pages.

Sarafianos, et al., "Adversarial Representation Learning for Text-to-Image Matching," Proceedings of the IEEE/CVF International Conference on Computer Vision (ICCV), 2019. pp. 5814-5824.

Singhal, et al., "Towards a Unified Framework for Visual Compatibility Prediction," Proceedings of the IEEE/CVF Winter Conference on Applications of Computer Vision (WACV), 2020. pp. 3607-3616.

Sinha, et al., "Attention Based Natural Language Grounding by Navigating Virtual Environment,". IEEE Winter Conference on Applications of Computer Vision (WACV), Dec. 21, 2018. 9 pages.

Tellex, et al., "Understanding natural language commands for robotic navigation and mobile manipulation," Twenty-fifth AAAI conference on artificial intelligence, 2011. pp. 1507-1514.

Vo, et al., "Composing text and image for image retrieval—an empirical odyssey," Proceedings of the IEEE Conference an Computer Vision and Pattern Recognition, 2019. pp. 6439-6448. 6439-6448.

Xu, et al., "Cross-Modal Attention With Semantic Consistence for Image-Text Matching," IEEE Transactions on Neural Networks and Learning Systems, vol. 31, No. 12, Dec. 2020. pp. 5412-5425.

Yu, et al., "Sketch me that shoe," Proceedings of the IEEE Conference on Computer Vision and Pattern Recognition, 2016. pp. 799-807.

Zeiler, M.D. and Fergus, R., "Visualizing and Understanding Convolutional Networks," Computer Vision ECCV, 2014. pp. 818-833.

Zhang, et al., "Self-attention generative adversarial networks," International Conference on Machine Learning, 2019. 10 pages.

Zhao, et al., "Memory Augmented Attribute Manipulation Networks for Interactive Fashion Search," IEEE Conference on Computer Vision and Pattern Recognition (CVPR), 2017. pp. 1520-1528.

* cited by examiner

Images
700

Source Image
210

Text query:
Short Length
Sleeveless
Thin Straps
Shiny

230

Image Database
370

Target Image
240

TEXT-CONDITIONED IMAGE SEARCH BASED ON TRANSFORMATION, AGGREGATION, AND COMPOSITION OF VISIO-LINGUISTIC FEATURES

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates to image searching. Particularly, this disclosure relates to techniques for text-conditioned image searching based on transformation, aggregation, and composition of visio-linguistic features.

BACKGROUND

Online shopping represents a significant and increasing portion of world economic activity. Vendors typically provide online catalogs from which users can shop. Such catalogs can be extensive, and it can be difficult for the user to find the item that precisely meets their desires or requirements. Various types of product search functions that incorporate user feedback are typically provided. One such example search function is a text-conditioned image search function, where the user provides an input image along with an input text that effectively edits one or more details of that input image based on what the user is looking for. Unfortunately, such text-conditioned image search systems are unable to capture detailed user requirements which cannot be precisely encapsulated with only a single input image and a combination of keywords in the input text. These shortcomings of existing systems can discourage the shopper and potentially result in a lost sales opportunity. As will be appreciated in light of this disclosure, the reason for these limitations is that existing systems lack the capability to decompose a complex set of textual edits that span multiple levels of granularity depicted in the image, the levels ranging from relatively local edits (e.g., the neckline of a dress depicted in the given input image or other lower level details) to relatively global edits (e.g., the color and pattern of the dress or other relatively higher level details). To this end, existing techniques are limited in their ability to understand subtleties with respect to content (e.g., the dress) and style features (e.g., button or clasp, neckline, color, pattern of dress, etc.). Therefore, complex and non-trivial issues associated with text-conditioned image search remain.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
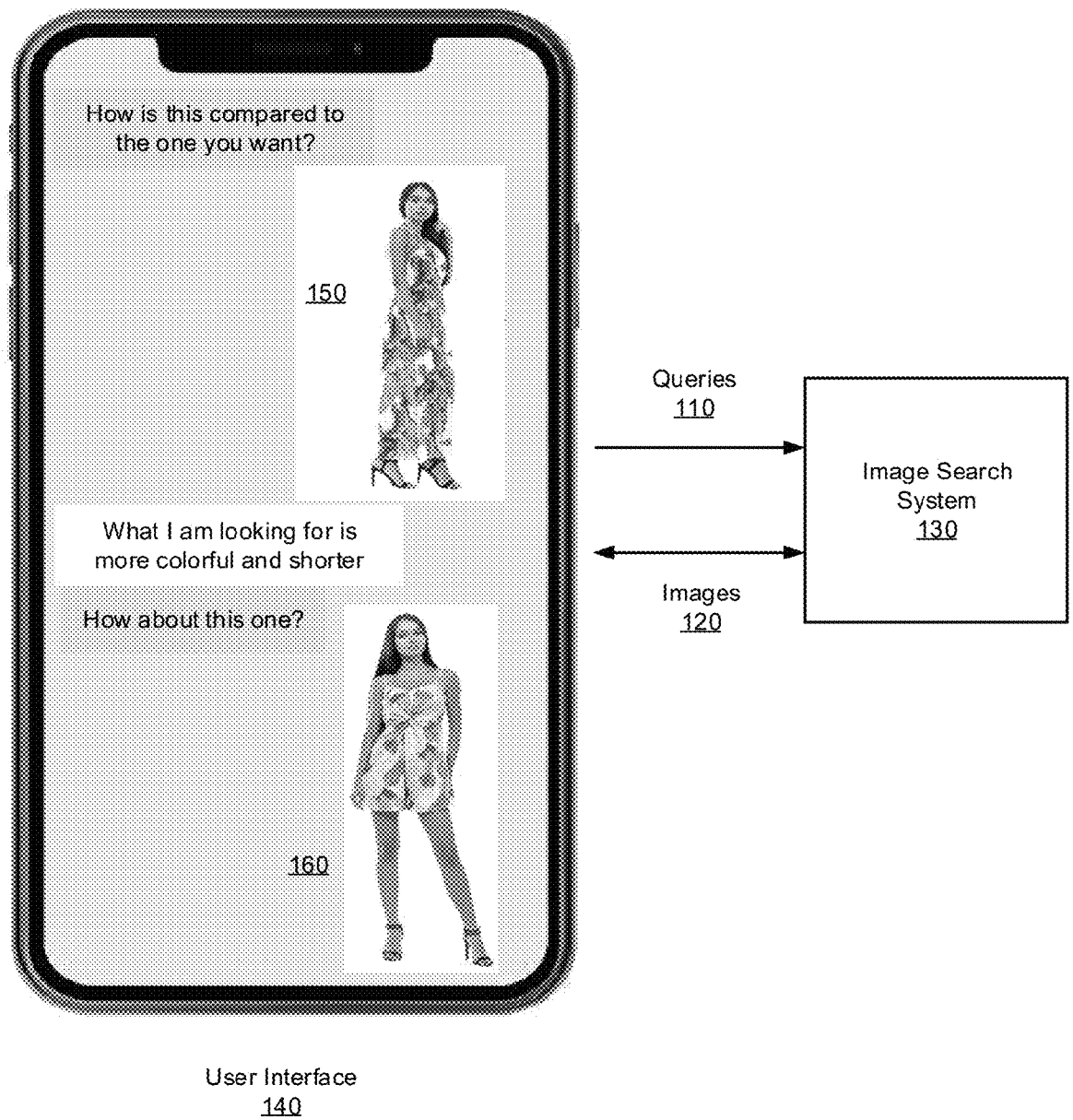
FIG. 1 illustrates user interaction with an image search system, in accordance with an embodiment of the present disclosure.

Techniques are disclosed for improved text-conditioned image search. Although the techniques can be applied in any number of text-conditioned image search applications, they are particularly useful when applied to the problem of retrieving a user's desired image from a catalogue based on a provided source image (as a reference) in combination with user feedback in the form of a text query. The techniques can be used, for instance, to decompose a complex set of textual edits (from the text query) that span multiple levels of granularity depicted in the source image, wherein the levels of granularity range from relatively local edits to relatively global edits. For example, the user may use a text query to state that the item (e.g., a dress) depicted in the given source image is close to what they are looking for, but they further specify in the text query one or more relatively local edits (e.g., a lower neckline than what is depicted in the input image) and one or more relatively global edits (e.g., the desired color and pattern of the dress). The system returns feedback-conditioned results in the form of a target image depict the item have the various features specified in the text. The user may accept that returned image, or may provide additional textual feedback to further refine the search process. In any case, the user is provided with an image that meets the given search criteria, the given search criteria including a source image and textual guidance.

Existing techniques for searching based on a source image and user text query typically extract features from the image and features from the text query to generate a composite representation of the image and the text to generate target features that represent an understanding of what the user is searching for and are used to guide the search. These techniques, however, fail to efficiently compose visual representation with natural-language semantics because, as previously explained, they are unable to incorporate multiple semantic edits on the visual features at different levels of granularity ranging from relatively local edits to relatively global edits. For instance, a user can propose relatively simple local edits to the shape and style of distinct regions of a dress, such as sleeves and neckline, by asking for "short sleeves and peasant neckline" via the text input. However, the user can also propose more complex cross-granular semantic edits which implicate both local and global levels of granularity, such as "turquoise scoop neck shirt with white decorative motif and a decal design." In a more general sense, existing techniques are incapable of addressing both "where to look within the given image" and "how to change that portion of the image" objectives in the text query over varying levels of granularity ranging from global (e.g., the entire image or a large portion thereof) to local (e.g., dealing with smaller fine-grained features).

In contrast, the techniques disclosed herein, for text-conditioned image search, employ a process for generating multiple visual transformations over varying levels of granularity to learn a visio-linguistic representation of the source image and the text query. This approach allows for the ability to handle more complex text queries that can address multiple requests which may encompass varying scales of detail (also referred to herein as varying levels of granularity, ranging from lower to higher granularity levels) in the source image. Thus, the techniques disclosed herein provide decompose the source image and text query with respect to different granularity levels to gain a better understanding of how the source image should change when text feedback is applied. This allows the system to better capture and utilize detailed and potentially complex user requirements as collectively expressed in the image and text query. Target features can then be generated which are more accurately tailored to the user's desires and which in turn provide improved image search results.

The disclosed techniques for transformation, aggregation, and composition of visio-linguistic features, which will be explained in greater detail below, are accomplished using machine learning. In one example embodiment, an image search system includes a first neural network (NN) trained to decompose a source image into a first visual feature vector associated with a first level of granularity, and a second visual feature vector associated with a second level of granularity. The system further includes a second NN trained to decompose a text query into a first text feature vector associated with the first level of granularity, a second text feature vector associated with the second level of granularity, and a global text feature vector. Note that the text query defines a target image attribute and the global text feature vector spans multiple levels of granularity. Each neural network includes one or more layers having unique sets of weighting factors associated with a neuron or pathway between neurons. The weighting factors result from training of the network. These weights characterize the network's intelligence and ability to extract visual and textual features from the image and text query respectively, as variously described herein.

The system further includes a semantic feature transformation module configured to generate a first image-text embedding based on the first visual feature vector and the first text feature vector, and a second image-text embedding based on the second visual feature vector and the second text feature vector. The image text embedding encodes information from visual features and textual features. The system further includes a visio-linguistic composition module configured to compose a visio-linguistic representation based on a hierarchical aggregation of the first image-text embedding with the second image-text embedding. The visio-linguistic representation encodes a combination of visual and textual information at multiple levels of granularity. The system can then search for a target image that includes the visio-linguistic representation and the global text feature vector, so that the target image relates to the target image attribute. The target image is provided to the user as the image search result.

While this disclosure focuses on image retrieval (for example, retrieval of images from a catalog), many other applications are possible including music search, document search, booking travel arrangement (where the user modifies details of the given music, document, or travel plan with a text query), and photo editing (where the user requests changes in a given image with a text query), to name just a few. For example, in the case of music search, an audio encoding neural network would be used instead of an image encoding neural network. Numerous embodiments will be appreciated in light of this disclosure.

Definition of Terms

Figure 7:
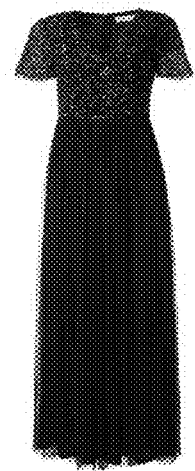
FIG. 7 illustrates one example of source and target images along with a text query, in accordance with an embodiment of the present disclosure.
Figure 7:
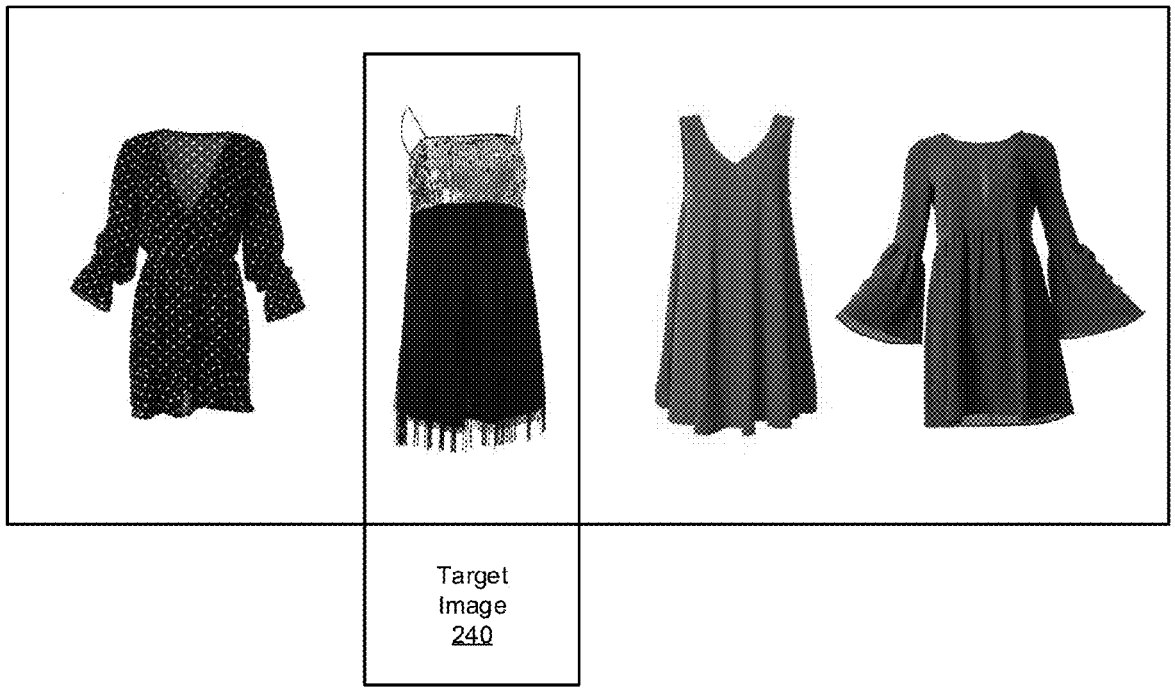

The term "source image" (or "reference image") as used herein refers to an image that is used as the starting point for a search or for an iteration of the search. The source image may depict an item, product, or object, that illustrates, to some degree, what the user is searching for. An example source image 210 is shown in FIG. 7.

The term "target image" as used herein refers to an image that is generated or otherwise returned as a result of the search (or an iteration of the search). An example target image 240 is also shown in FIG. 7.

The term "text query" as used herein refers to a text string that is provided by the user to describe the item that they are searching for or to provide feedback regarding the target image that was generated from a previous search iteration. An example text query could be "I'm looking for a casual dress," or "what I'm looking for is shorter and more colorful." To this end, the text query can be thought of as a supplement to and/or a refinement of the source image (where the text query is additive to the source image) and/or a modifier of the source image (where the text query changes one or more features of the source image).

The term "features" as used herein refers to data generated by the neural networks which encapsulate and represent properties of the image and the text query. For example, a visual feature is generated by the image encoding neural network and represents properties associated with the source image. A text feature is generated by the text encoding neural network and represents properties associated with the text query.

The term "visual feature vector" as used herein refers to a set of visual features at a particular level of granularity. For example, a visual feature vector comprises image features that are generated by the image encoding neural network which represent properties associated with the image including properties or characteristics of objects, backgrounds, or anything else that may be of interest in the image.

The term "text feature vector" as used herein refers to a set of text features at a particular level of granularity. For example, a text feature vector comprises text features that are generated by the text encoding neural network which represent properties associated with the text query.

The term "level of granularity" as used herein refers to hierarchical levels of detail with increasing abstraction from one level to the next. For example, in one embodiment, the first layer of the image encoding neural network generates features at a fine (local or low) level of granularity associated with relatively small regions of the image (e.g., button or clasp style, neckline or piping on sleeves of dress); the second layer of the image encoding neural network generates features at a intermediate (medium) level of granularity associated with somewhat larger or otherwise middle-sized regions of the image (e.g., length, waistline or pleating of dress); and the third layer of the image encoding neural network generates features at a coarse (global or high) level of granularity associated with relatively dominant regions of the image (e.g., color or pattern of dress). As another example, a fine or local level of granularity for a sneaker depicted in an image could include, for instance, a small decal or design or logo; a medium or intermediate level of granularity could be associated with trim lines or stripes that extend over a larger portion of the sneaker; and a high level of granularity could be associated with the color or texture of the overall material of the sneaker.

The term "visio-linguistic" as used herein refers to a combination of visual and textual data extracted from an image and a text query. For example, an image of a dress provides the visual data and a text query stating the color blue and a length of short provides the textual data.

The term "global text feature vector" as used herein refers to a set of text features that span multiple levels of granularity, for example, all of the levels of granularity associated with the layers of the neural networks.

The term "image-text embedding" as used herein refers to a mathematical combination of feature vectors that jointly encodes information from visual features and textual features.

The term "hierarchical aggregation" as used herein refers to a combining of image-text embeddings generated from the different layers of the neural networks over the hierarchical levels of granularity (e.g., the increasing levels of abstraction).

The term "composite feature vector" as used herein refers to a fusion of a global text feature vector with the visio-linguistic representation of an image and a text query.

The terms "fusion" or "fusing" as used herein with respect to two vectors refers to the calculation of an offset between the two vectors, which may be followed by a scaled normalization of that offset.

General Overview

As noted previously, the available technical solutions for image searching are inadequate, particularly when the search space (e.g., catalog or database) is large and detailed user requirements cannot be adequately captured with a single image or combination of keywords. Many existing approaches do not allow the user to engage in a dialog and interactively provide feedback to enable efficient navigation of the catalog. Although some existing search techniques can incorporate textual input from the user to supplement the image-based search, these techniques, as previously described, fail to incorporate multiple semantic edits on visual features at different levels of granularity and are therefore limited, for example, in their ability to handle text feedback that includes complex queries which address multiple features in the image at different scales of detail. As such, a technical solution for better image-based search as provided herein is needed.

To this end, techniques are provided herein for text-conditioned image search based on transformation, aggregation, and composition of visio-linguistic features from both the given image and the given text query to generate improved context aware features for image retrieval, as will be explained in greater detail below. The techniques provide an improvement in searching efficiency and accuracy over existing technical solutions, which fail to capture and utilize detailed and potentially complex user requirements.

In more detail, a methodology implementing the techniques according to one example embodiment of the present disclosure includes receiving a source image and a text query defining target image attributes. The method also includes using a first neural network to decompose the source image into a first visual feature vector associated with a first level of granularity, and a second visual feature vector associated with a second level of granularity. The method further includes using a second neural network to decompose the text query into a first text feature vector associated with the first level of granularity, a second text feature vector associated with the second level of granularity, and a global text feature vector, wherein the global text feature vector spans multiple levels of granularity. More specifically, one or more layers of these neural networks are configured during training to extract visual and textual features from the image and text respectively.

The method further includes generating a first image-text embedding based on the first visual feature vector and the first text feature vector, and a second image-text embedding based on the second visual feature vector and the second text feature vector, wherein the image text embedding encodes information from visual features and textual features. The method further includes composing a visio-linguistic representation based on a hierarchical aggregation of the first image-text embedding with the second image-text embedding, wherein the visio-linguistic representation encodes a combination of visual and textual information at multiple levels of granularity (e.g., local and global levels, or local and medium levels, or medium and global levels, or each of local, medium and global levels). The method further includes identifying a target image that includes the visio-linguistic representation and the global text feature vector, so that the target image relates to the target image attribute, the target image to be provided as a result of the image search. Many other variations and alternative embodiments will be appreciated in light of this disclosure.

Framework and System Architecture

FIG. 1 illustrates user interaction 100 with an image search system 130, in accordance with an embodiment of the present disclosure. A user interface 140 is shown, which may be hosted on any suitable platform such as a smart phone, tablet, mobile device, laptop, workstation, etc. The user interface 140 is presented to the user to allow the user to interact with the image search system 130 through a series of queries 110 and images 120. For example, an initial image 150 of a dress is presented to the user along with a question: "How is this compared to the one you want?" The user then replies with a text query/response: "What I am looking for is more colorful and shorter." The image search system 130, then provides a target image 160, which more closely matches the user's requirements, for example by finding a dress with most of the same characteristics as the dress in the source image, but shorter and more colorful. If the user is not completely satisfied, the process may be repeated any number of times until the correct target image is obtained.

Figure 2:
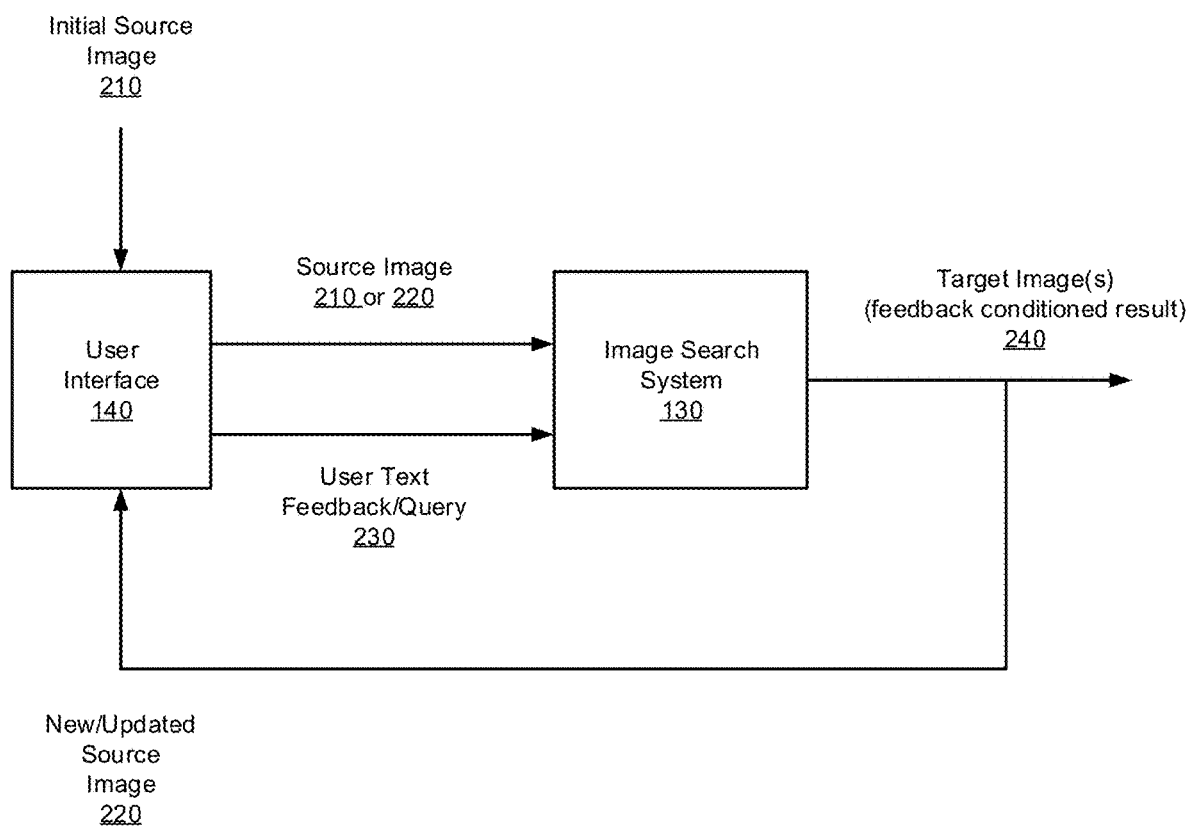
FIG. 2 illustrates operation of the image search system, in accordance with an embodiment of the present disclosure.

FIG. 2 illustrates operation 200 of the image search system 130 at a high level, in accordance with an embodiment of the present disclosure. In some embodiments, the image search system 130 may be part of a larger online shopping system, or other application. The user interface 140 is shown to accept an initial source or reference image 210, which may be provided by the user, the online shopping system, or from any other source. The source image 210 is presented to the image search system 130, along with a user text query 230. The text query provides additional details about the user's requirements. For example, the query may indicate that the user is looking for something similar to the source image 210, but in a different color and/or size, or it may indicate that the user is looking for something entirely different from the source image. The image search system 130 is configured to process the image 210 and the text query 230 to generates a visio-lingusitic representation, based on an aggregation of visual feature vectors and text feature vectors at varying levels of granularity, to produce improved context aware features to be used as parameters for a search through the catalog or database of images from which the user is shopping. The image search system 130 generates a target image 240 as a user feedback condition result which is presented to the user, through the user interface 140, as the new/updated source image 220.

In an example use case, an initial source image depicts a sedan style automobile and the user text query specifies that the user is looking for something sportier, with two doors, and in a red color. The image search results in a target image that depicts a sports car based on the user's preferences. The process may then repeat allowing the user to refine the search or make other change requests.

In another example use case, the user is searching for a particular photograph of the Eiffel Tower. The initial source image depicts the Tower during the day and surrounded by tourists. The text query indicates that the user desires an image taken at night with the tower lit up and without people in the foreground.

It will be appreciated that numerous other applications and example use cases are possible in light of the present disclosure. Such applications increase search efficiency through an inventory of products, improve the user experience, and potentially increase sales.

Thus, the foregoing framework provides a system and methodology for text-conditioned image searching based on based on transformation, aggregation, and composition of visio-linguistic features. Numerous example configurations and variations will be apparent in light of this disclosure.

Figure 3:
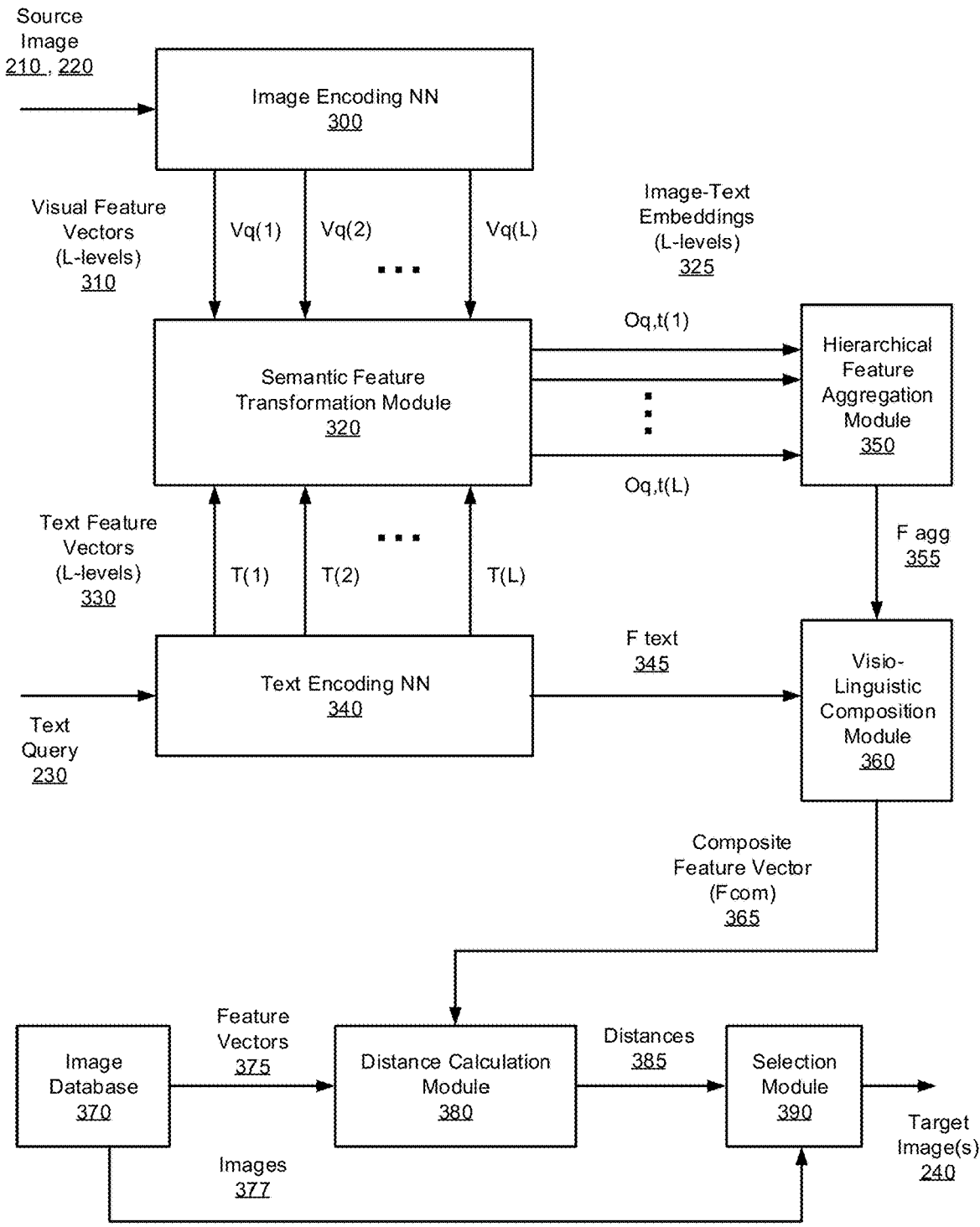
FIG. 3 is a block diagram of the image search system, configured in accordance with an embodiment of the present disclosure.

FIG. 3 is a block diagram of the image search system 130, configured in accordance with an embodiment of the present disclosure. The image search system 130 is shown to include an image encoding neural network 300, a text encoding neural network 340, a semantic feature transformation module 320, a hierarchical feature aggregation module 350, a visio-liguistic composition module 360, an image database 370, a distance calculation module 380, and a selection module 390.

The image encoding neural network 300 is configured to decompose the source image 210 or 220 into L visual feature vectors Vq(l) 310. In some embodiments, the image encoding neural network 300 is a convolutional neural network (CNN). Each vector Vq is associated with a different level of granularity with increasing abstraction from the first level to the L-th level. The L levels may include, for instance, a local level, one or more medium levels, and a global level, although the spectrum of granularity can vary from one embodiment to the next such as the case where there are for instance, only a local level and a global level, or only a medium level and a global level, or only a local level and a medium level, as will be appreciated. The operation of the image encoding neural network 300 will be described in greater detail below in connection with FIG. 4.

The text encoding neural network 340 is configured to decompose the text query 230 into L text feature vectors T(l) 330 and a global text feature vector $F_{text}$ 345. Each vector T(l) is associated with a different level of granularity with increasing abstraction from the first level to the L-th level. The L levels may include, for instance, a local level, one or more medium levels, and a global level, although the spectrum of granularity can vary from one embodiment to the next such as the case where there are for instance, only a local level and a global level, or only a medium level and a global level, or only a local level and a medium level, as will be appreciated. The operation of the text encoding neural network 340 will be described in greater detail below in connection with FIG. 5.

The semantic feature transformation module 320 is configured to generate L image-text embeddings $O_{q,t}(l)$ 325 by transforming the visual feature vectors Vq(l) 310 based on textual cues from the text feature vectors T(l) 330. The image text embeddings encode information from visual features and textual features. The operation of the semantic feature transformation module 320 will be described in greater detail below in connection with FIG. 6.

The hierarchical feature aggregation module 350 is configured compose a visio-linguistic representation $F_{agg}$ 355 based on a hierarchical aggregation of the image-text embeddings $O_{q,t}(l)$ 325. The visio-linguistic representation encodes a combination of visual and textual information at multiple levels of granularity.

Since CNNs learn features hierarchically with increasing levels of abstraction, the image-text embeddings also conform to a coarse sequential structure of features. To obtain an efficient visio-lingusitic representation, an aggregation function is used which can learn to encapsulate the varying granularities encoded in the features of the image-text embeddings $O_{q,t}(l)$ 325. The image-text embeddings $O_{q,t}(l)$ 325 are first linearly projected to a fixed dimensionality corresponding to the finest granularity level (e.g., local level). The projected embeddings are denoted as $G_{q,t}(l)$. A long short-term memory (LSTM) recurrent neural network is then employed over L timesteps to aggregate $G_{q,t}(l)$ into $H_{hfa}$, which is then passed through a batch normalization layer and a fully connected layer to obtain the visio-linguistic representation $F_{agg}$ 355.

The visio-liguistic composition module 360 is configured to fuse or unify the visio-linguistic representation $F_{agg}$ 355 with the global text feature vector $F_{text}$ 345 to generate a composite feature vector $F_{com}$ 365, wherein the fusing comprises calculating a residual offset between the visio-linguistic representation $F_{agg}$ 355 and the global text feature vector $F_{text}$ 345 and normalizing the residual offset. In some embodiments, this may be expressed as $$f_{com} = \delta \frac{f_{agg} + f_{text}}{\|f_{agg} + f_{text}\|_2}$$

where the δ parameter denotes a trainable normalization scale, and $\|\cdot\|2$ denotes the $L_2$ norm.

The image database 370 is configured to store and provide potential target images 377 (e.g., images of items, objects, or products for which the user may be searching). The database also stores feature vectors 375 that are associated with each potential target image 377.

The distance calculation module 380 is configured to calculate a distance 385 between the composite feature vector $F_{com}$ 365 (which is based on the source image 210, 220 and the text query 230) and the feature vector 375 associated with the potential target image. In some embodiments, the distance 385 is calculated as a Euclidean distance or a cosine distance.

The selection module 390 is configured to select one or more of the potential target images 377 as an identified target image 240 based on the distances 385. For example, in some embodiments, if the distance 385 is less than a threshold value, the potential target image 377 is considered to be close enough to the user's request (in the form of source image and text query) to be considered a suitable target image 240 for presentation to the user. Said differently, if the distance 385 is less than the threshold value, the potential target image 377 includes a visio-linguistic representation and global text feature vector with characteristics such that the target image relates to the desired target image attribute. The user may then accept the proffered target image 240, or continue the search using the target image 240 as a new/updated source image 220 in combination with a new text query 230 to refine the search.

Figure 4:
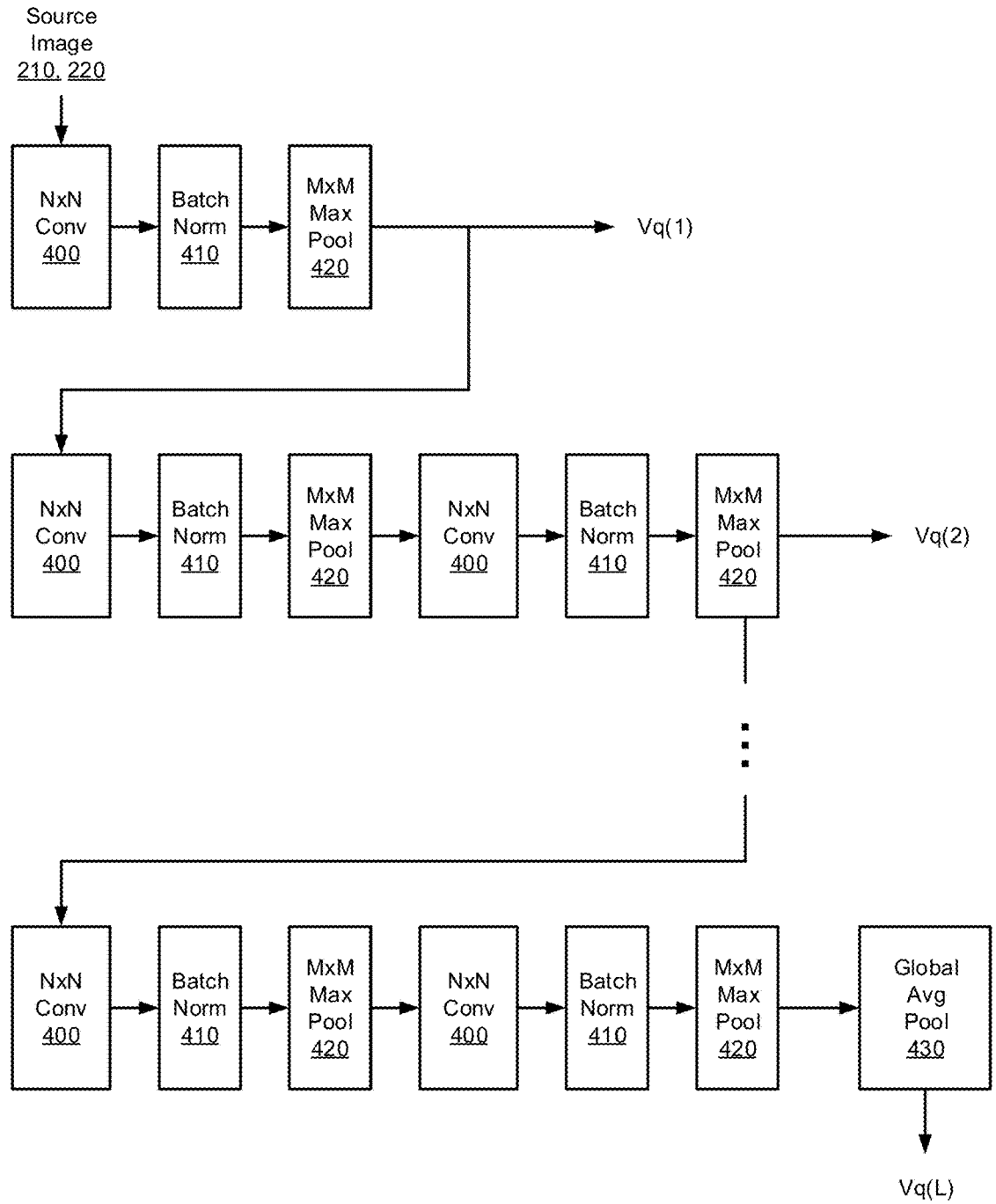
FIG. 4 is a block diagram of the image encoding neural network, configured in accordance with an embodiment of the present disclosure.

FIG. 4 is a block diagram of the image encoding neural network 300, configured in accordance with an embodiment of the present disclosure. The image encoding neural network 300 is shown as a CNN comprising a stack of layers that include N×N convolutional layers 400, batch normalization layers 410, and M×M max pooling layers 420, that are interconnected in a repeating manner as shown. In some embodiments, N is 7 and M is 3. Additionally, the image encoding neural network 300 includes a global average pooling layer 430 as the final layer of the network. In some embodiments, the image encoding neural network 300 is implemented as a ResNet neural network, although other such commercially available neural networks may be used, in light of the present disclosure. The source image 210, 220 is provided to the first N×N convolutional layer 400. The first of the visual feature vectors 310, Vq(1) is extracted at the output of the first group of layers 400, 410, and 420, as shown. The second of the visual feature vectors 310, Vq(2) is extracted at the output of the second group of layers 400, 410, 420, 400, 410, and 420, as shown. The final of the visual feature vectors 310, Vq(L) is extracted at the output of the final group of layers 400, 410, 420, 400, 410, 420, and 430 as shown. The training process for the image encoding neural network 300 is described in greater detail below in connection with FIGS. 8 and 9.

Figure 5:
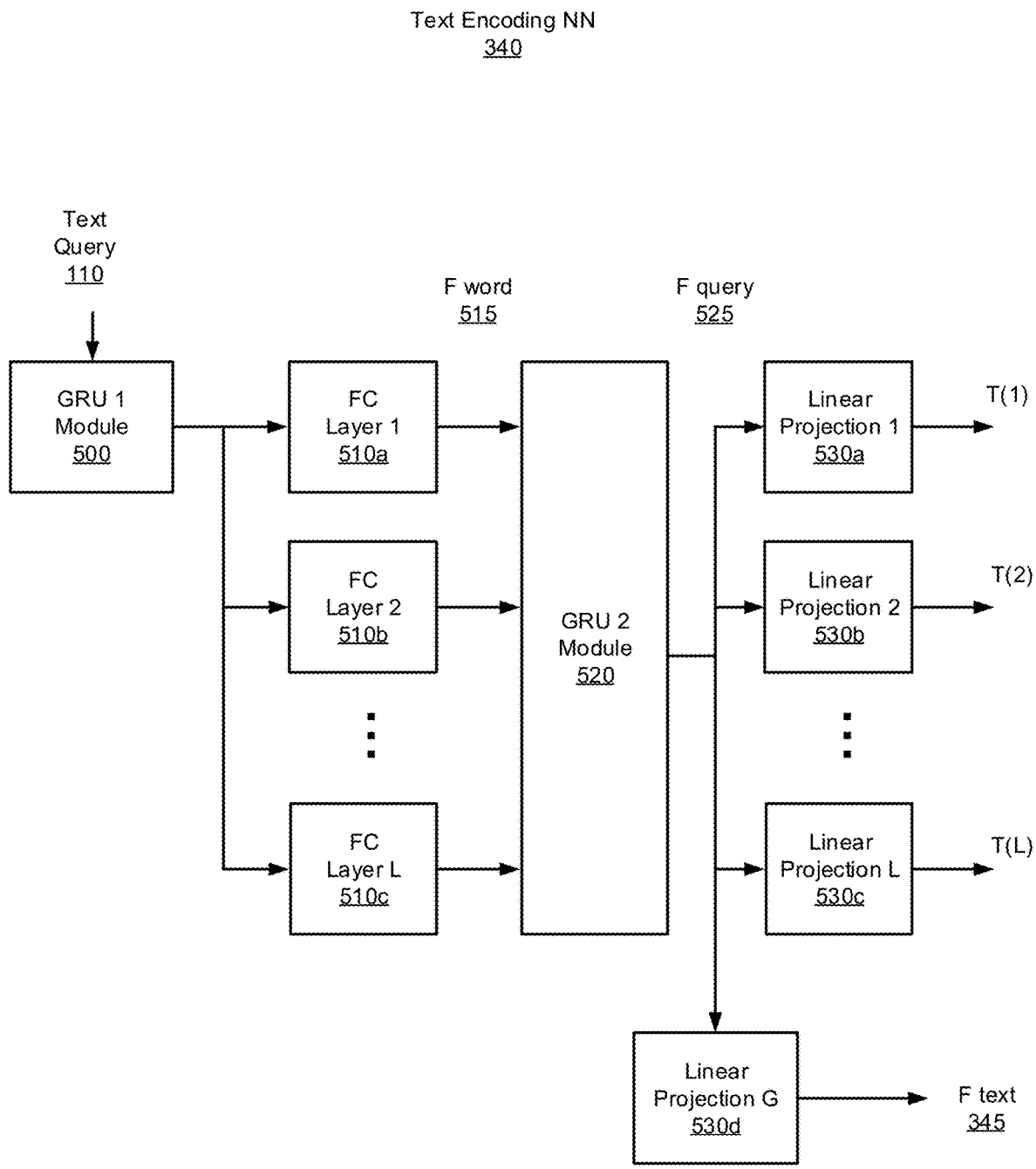
FIG. 5 is a block diagram of the text encoding neural network, configured in accordance with an embodiment of the present disclosure.

FIG. 5 is a block diagram of the text encoding neural network 340, configured in accordance with an embodiment of the present disclosure. The text encoding neural network 340 is configured to generate text feature vectors at corresponding levels of granularity to the visual feature vectors. The text encoding neural network 340 is shown to include a first Gated Recurrent Unit (GRU) module 500, L parallel Fully Connected (FC) layers 510a, . . . 510c, a second GRU module 520, and L+1 parallel linear projection modules 530a, . . . 530d. The first GRU 500 and the FC layers 510 are trained to transform the text query 110 into word level features 515. The second GRU 520 is configured to generate query text features 525 from the word level features 515 which are then projected, by projection modules 530, into the L text feature vectors T(1), . . . T(L) 330 and the global text feature vector $F_{text}$ 345. The training process is described in greater detail below in connection with FIGS. 8 and 9.

Figure 6:
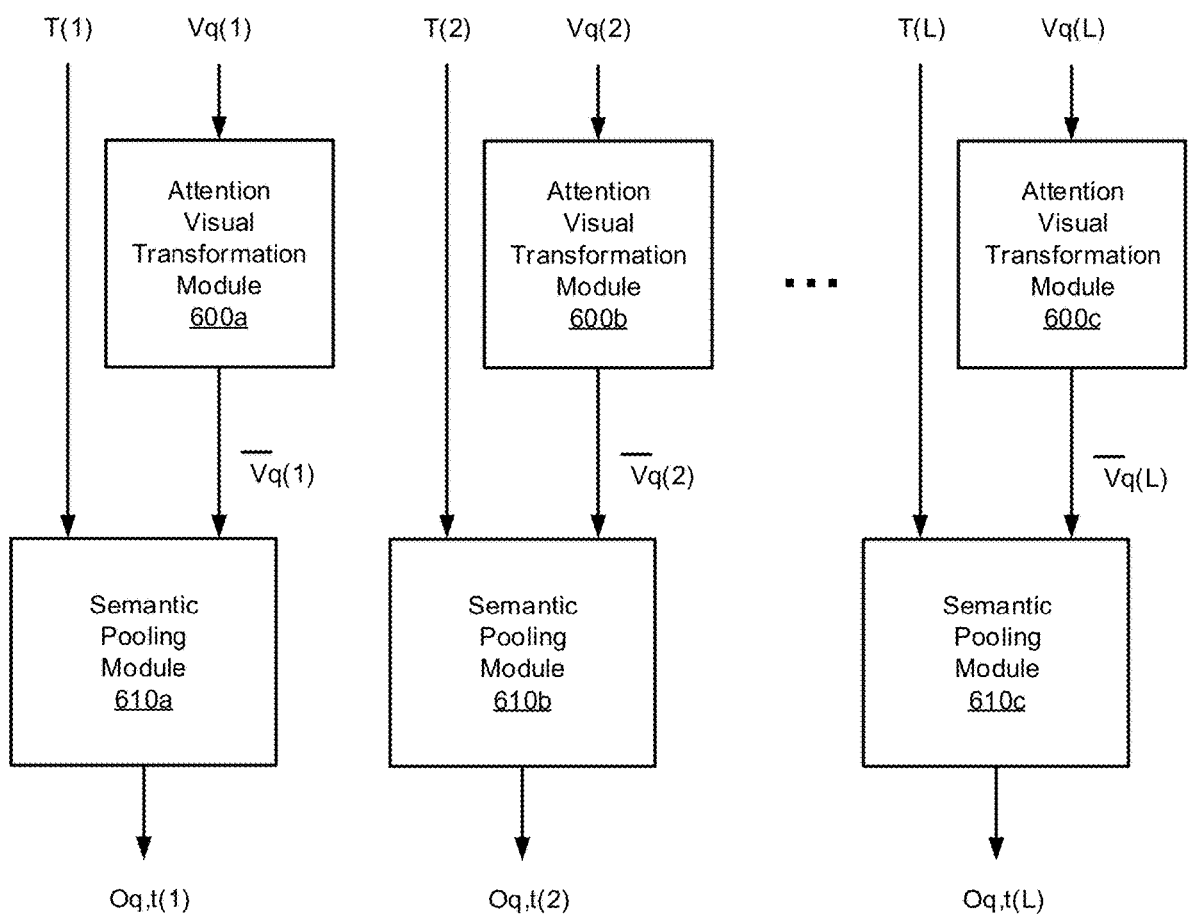
FIG. 6 is a block diagram of the semantic feature transformation module, configured in accordance with an embodiment of the present disclosure.

FIG. 6 is a block diagram of the semantic feature transformation module 320, configured in accordance with an embodiment of the present disclosure. The semantic feature transformation module 320 is shown to include attention visual transformation modules 600 and sematic pooling modules 610 which operate on each pair of text feature vectors T(l) 330 and visual feature vectors Vq(l) 310 to generate L image-text embeddings $O_{q,t}(l)$ 325.

The attention visual transformation module 600 is configured to transform Vq(l), denoted as $V_q^\ell$, into a volumetric representation $\bar{V}_q^\ell$ using parallel convolutional layers (denoted $\Theta_q$, $\Theta_k$, $\Theta_v$). In some embodiments this may be expressed as $$Q^\ell = \Theta_q(V_q^\ell), \mathcal{K}^\ell = \Theta_k(V_q^\ell), \mathcal{V}^\ell = \Theta_v(V_q^\ell)$$

$$\mathcal{A}_{self}^\ell = \text{softmax}((Q^\ell)^T \mathcal{K}^\ell)$$

$$E^\ell = \mathcal{V}^\ell (\mathcal{A}_{self}^\ell)^T$$

$$\bar{V}_q^\ell = \beta \mathcal{V}^\ell + V_q^\ell$$

The feature vector $\bar{V}_q^\ell$ encodes global visual information along with selectively aggregated spatial context which improves the semantic consistency in the representation. In some embodiments, the scale factor β is a learnable scalar parameter that is also generated by the training process The sematic pooling module 610 is configured to generate the image-text embeddings $O_{q,t}(l)$ 325 based on the attentive visual representation $\bar{V}_q^\ell$ and the text feature vectors T(l) 330. In some embodiments this may be expressed as $$\mathcal{A}_{cross}^\ell = \bar{V}_q^\ell \circledast T^\ell$$

where $\circledast$ is the convolution operator, and $$M^\ell = \text{softmax}(\mathcal{A}_{cross}^\ell / \mathcal{T})$$

where $M^\ell$ is the softmax temperature.

The feature-weighted mask $M^\ell$ is used as a kernel to pool each channel in the attentional visual feature map $\bar{V}_q^\ell$ to generate a visio-linguistic feature $S^\ell$ as $$S^\ell(c) = \sum_{h=1}^{H_\ell} \sum_{w=1}^{W_\ell} M^\ell(h, w) \circledast \bar{V}_q^\ell(c, h, w)$$

where c is the channel in the l-th representation, and $H_\ell$ and $W_\ell$ are the height and width of the volumetric representation of $\bar{V}_q^\ell$. The image-text embeddings $O_{q,t}(l)$ 325 are then generated as a weighted addition of the visio-linguistic feature $S^\ell$ with a pooling of the volumetric representation of $\bar{V}_q^\ell$.

FIG. 7 illustrates one example of images 700 including source and target images along with a text query, in accordance with an embodiment of the present disclosure. An example source image 210 of a dress is shown. An example text query 230 is also presented, which includes the terms "short length," "sleeveless," "thin straps," and "shiny." A small sampling of the image database 370 is also shown to include four images associated with dresses. The second of those images is chosen as the target image 240, based on a match up with the user source image and text query, the match up based on the calculated distances 385.

Figure 8:
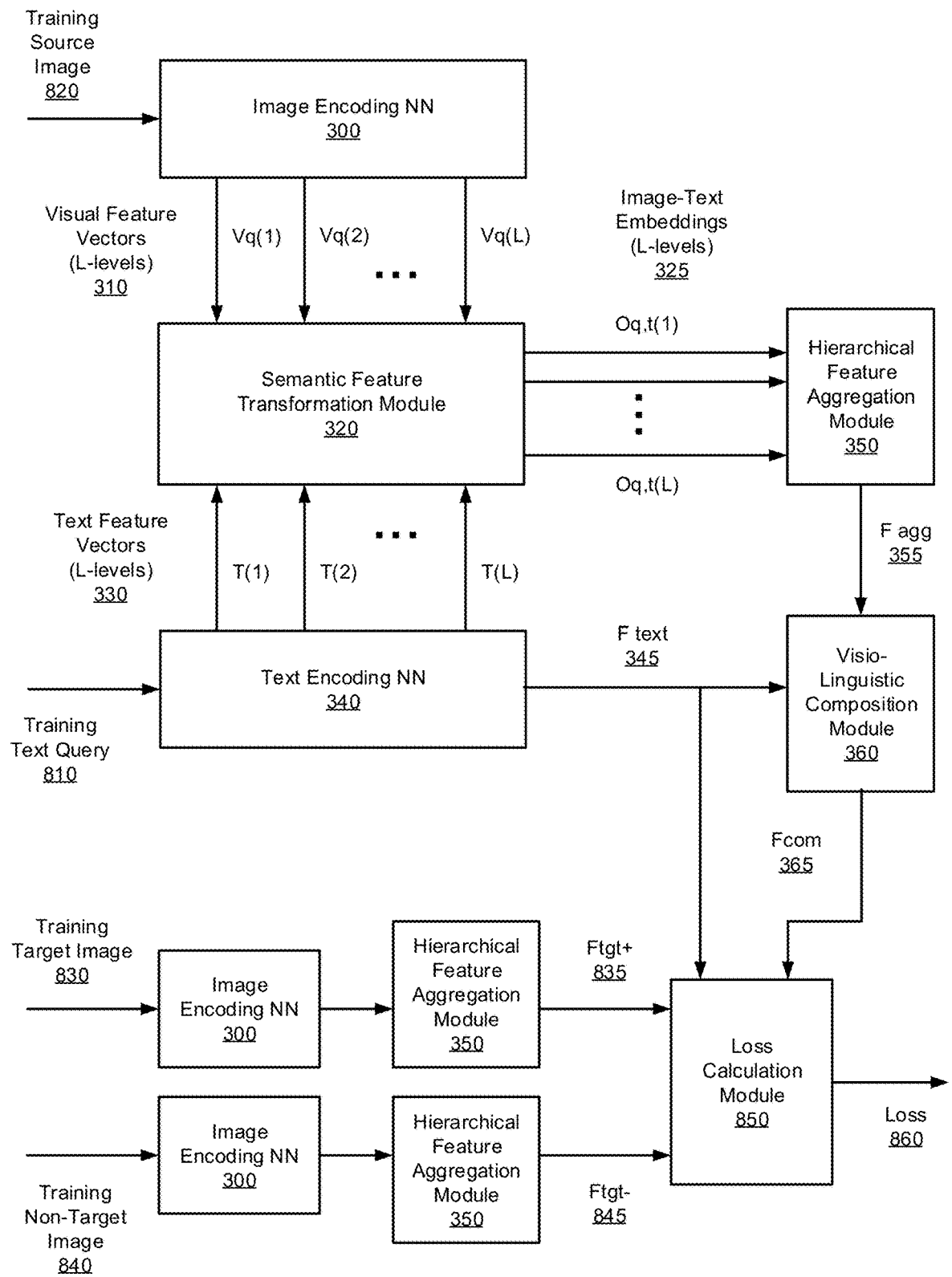
FIG. 8 is a block diagram of a system for training of the image search system, configured in accordance with an embodiment of the present disclosure.

FIG. 8 is a block diagram of a system 800 for training of the image search system 130, configured in accordance with an embodiment of the present disclosure. The training system 800 is shown to include a loss calculation module 850 which is configured to generate loss values 860 for training of the image encoding neural network 300, the text encoding neural network 340, the hierarchical feature aggregation module 350, and the visio-linguistic composition module 360 of the image search system 130. A training database is employed which provides training source images 820, training text queries 810, training target images 830, training non-target images 840.

The image encoding neural network 300 and hierarchical feature aggregation module 350 are employed to generate training target image feature vectors ($F_{tgt}+$) 835 from the training target images 830, and generate training non-target image feature vectors ($F_{tgt}-$) 845 from the training non-target images 840. The training target image feature vectors ($F_{tgt}+$) 835 provide features associated with training target images 830 that should be offered to the user by the image search system 130, in response to the training source image 820 and the training text query 810. The training non-target image feature vectors ($F_{tgt}-$) 845 provide features associated with training non-target images 840 that should be rejected by the image search system 130, in response to the training source image 820 and the training text query 810.

For each training iteration, a training source image 820 is provided to the image encoding neural network 300 and a training text query 810 is provided to the text encoding neural network 340. Composite feature vectors ($F_{com}$) 365, are generated from these inputs, as previously described in connection with the operation of the image search system. The loss calculation module 850 is configured to generate loss values 860 based on a measure of similarity between the composite feature vector ($F_{com}$) 365 and the training target image feature vector ($F_{tgt}+$) 835, and a measure of difference between the composite feature vector ($F_{com}$) 365 and the training non-target image feature vector ($F_{tgt}-$) 845. The operation of the loss calculation module 850 is described in greater detail below in connection with FIG. 9. The loss values 860 are then used to train the weights of the image encoding neural network 300, the weights of the text encoding neural network 340, and the parameters of the semantic feature transformation module 320, the hierarchical feature aggregation module 350, and the visio-linguistic composition module 360. The training may be accomplished using any suitable training techniques in light of the present disclosure.

Figure 9:
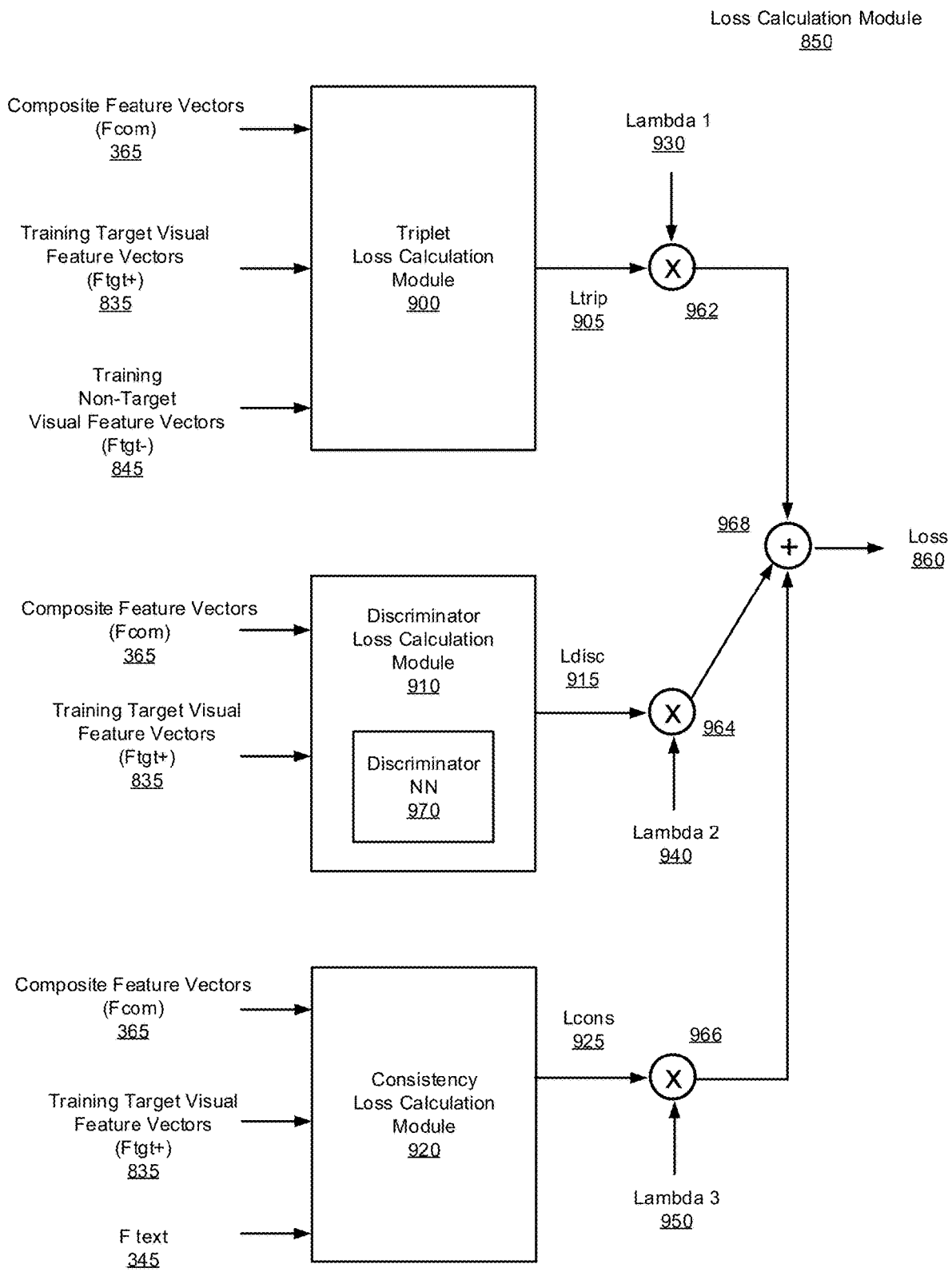
FIG. 9 is a block diagram of the loss calculation module, configured in accordance with an embodiment of the present disclosure.

FIG. 9 is a block diagram of the loss calculation module 850, configured in accordance with an embodiment of the present disclosure. The loss calculation module 850 is shown to include a triplet loss calculation module 900, a discriminator loss calculation module 910, a consistency loss calculation module 920, a first scaling module 962, a second scaling module 964, a third scaling module 966, and a summer 968.

The triplet loss calculation module 900 is configured to generate a first loss value $L_{triplet}$ 905 based on $F_{com}$ 365, $F_{tgt}+$ 835, and $F_{tgt}-$ 845. The primary training objective of the triplet loss is to constrain $F_{com}$ to align with $F_{tgt}++$ while simultaneously contrasting with $F_{tgt}--$. In some embodiments, $L_{triplet}$ may be generated according to the following equation:

$$\mathcal{L}_{triplet} = \log(1 + e^{\|f_{com} - f_{tgt}+\|_2 - \|f_{com} - f_{tgt}-\|_2})$$

where $\|\cdot\|_2$ denotes the L2 norm (e.g., a Euclidean distance). In some embodiments a cosine distance may be employed.

The discriminator loss calculation module 910 includes a discriminator neural network 970 and is configured to generate a second loss value $L_{disc}$ 915 based on $F_{com}$ 365 and $F_{tgt}+$ 835. The discriminator loss helps to improve the alignment of $F_{com}$ with $F_{tgt}+$ by utilizing a discriminator that penalizes distributional divergence of linear projections of these features. In some embodiments, $L_{disc}$ may be generated according to the following equation:

$$\mathcal{L}_{disc} = -\mathbb{E}[\log(D(f_{tgt}+))] - \mathbb{E}[\log(1 - D(f_{com}))]$$

Where $D(\cdot)$ is the discriminator neural network 970 which is trained end-to-end along with the image search system, and $\mathbb{E}[\cdot]$ is the mathematical expected value operation.

The consistency loss calculation module 920 is configured to generate a third loss value $L_{cons}$ 925 based on $F_{com}$ 365, $F_{tgt}+$ 835, and $F_{text}$ 345. The consistency loss constrains visual and linguistic projections of $F_{com}$ 365, denoted by $f_{gen}^{img}$ and $f_{gen}^{text}$, to align with latent embeddings $F_{tgt}+$ and $F_{text}$ respectively. The vector $f_{com}$ is projected using learnable transformations $\Omega_{img}^c$ and $\Omega_{text}^c$ to obtain $f_{gen}^{img}$ and $f_{gen}^{text}$ as $$f_{gen}^{img} = \Omega_{img}^c(f_{com})$$

$$f_{gen}^{text} = \Omega_{text}^c(f_{com})$$

The learnable transformations $\Omega_{img}^c$ and $\Omega_{text}^c$ are also generated by the training process. The alignment objective regularizes and reinforces the balanced utilization of both text and image in $F_{com}$. In some embodiments, $\mathcal{L}_{cons}$ may be calculated as $$\mathcal{L}_{cons} = \alpha_t \|f_{gen}^{text} - f_{text}\|_2 + \alpha_i \|f_{gen}^{img} - f_{tgt}+\|_2$$

where $\alpha_1$ and $\alpha_2$ are learnable scalar parameters that are also generated by the training process.

The total loss 860 is a weighted combination of $L_{triplet}$ 905, $L_{disc}$ 915, and $L_{cons}$ 925. Weighting scale factors $\lambda_1$ 930, $\lambda_2$ 940, and $\lambda_3$ 950 are applied by first scaling module 962, second scaling module 964, and third scaling module 966, respectively. The scaled losses are then summed by summer 968 to generate loss 860. In some embodiments, loss 860 can be expressed as $\mathcal{L}_{total}$:

$$\mathcal{L}_{total} = \lambda_1 \mathcal{L}_{triplet} + \lambda_2 \mathcal{L}_{disc} + \lambda_3 \mathcal{L}_{cons}$$

In some embodiments, the scale factors $\lambda_1$ 930, $\lambda_2$ 940, and $\lambda_3$ 950 are learnable scalar parameters that are also generated by the training process.

Methodology

Figure 10:
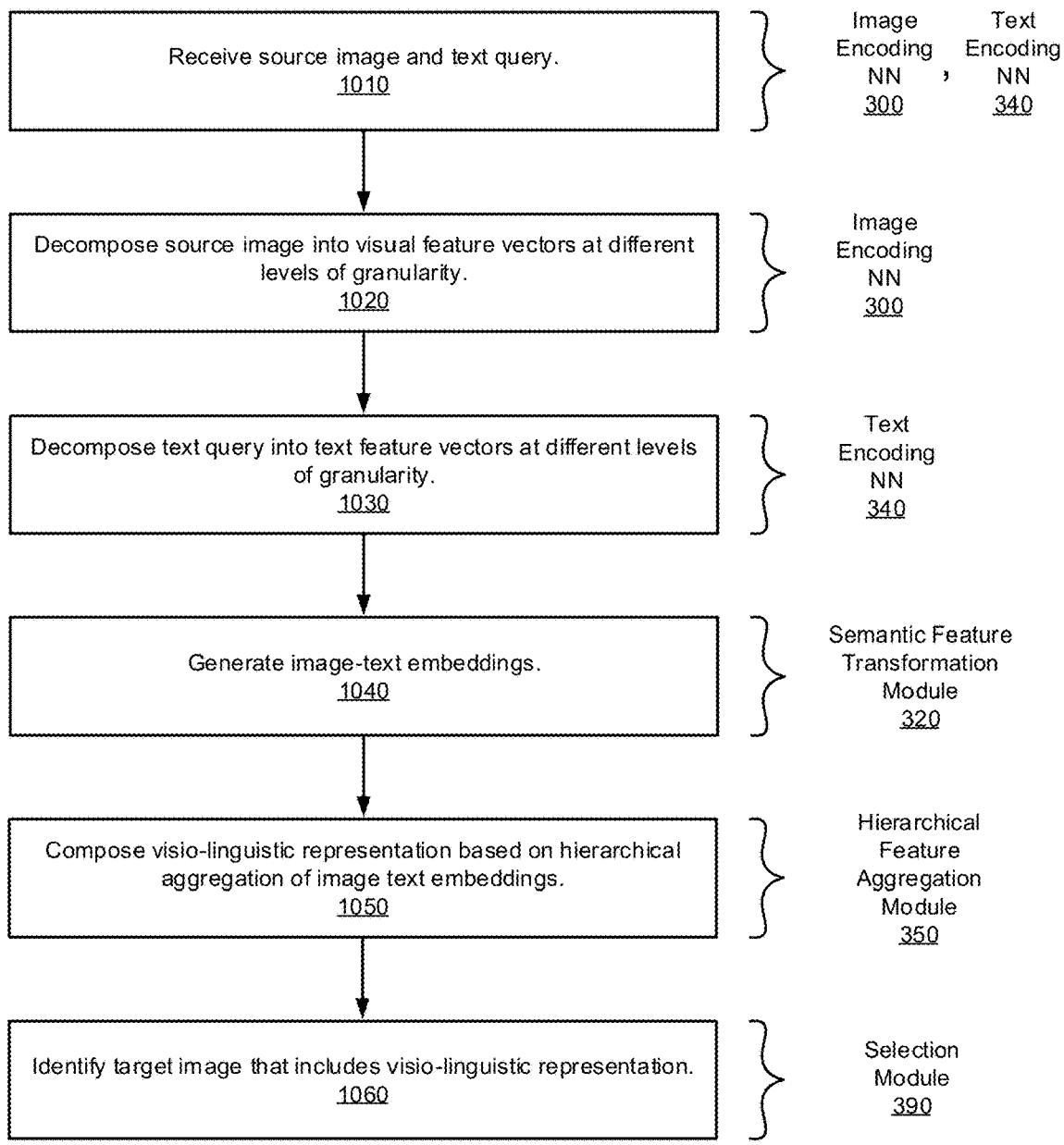
FIG. 10 is a flowchart illustrating a method for text-conditioned image searching, in accordance with an embodiment of the present disclosure.

FIG. 10 is a flowchart 1000 illustrating a method for text-conditioned image searching, in accordance with an embodiment of the present disclosure. As can be seen, the method is described with reference to the configuration of image search system 130, and components thereof, of FIGS. 2-6, 8, and 9. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration; rather, the text-conditioned search techniques provided herein can be used with a number of architectures and platforms and variations, as will be appreciated.

The method commences, at operation 1010, by receiving a source image and a text query. The source image and text query define attributes of a target image.

The method continues, at operation 1020, by decomposing the source image into a first visual feature vector associated with a first level of granularity (e.g., local or medium level), and a second visual feature vector associated with a second level of granularity (e.g., medium or global level). In some such example embodiments, a first neural network is employed to extract the first visual feature vector of the source image and the second visual feature vector of the source image. In some such embodiments, the first neural network is an image encoding convolutional neural network.

At operation 1030, the text query is decomposed into a first text feature vector associated with the first level of granularity (e.g., local or medium level), a second text feature vector associated with the second level of granularity (e.g., medium or global level), and a global text feature vector. In some such example embodiments, a second neural network is employed to extract the first text feature vector of the text query, the second text feature vector of the text query, and the global text feature vector of the text query. In some such embodiments, the second neural network is a text encoding neural network.

At operation 1040, a first image-text embedding is generated based on the first visual feature vector and the first text feature vector, and a second image-text embedding based on the second visual feature vector and the second text feature vector. The image text embedding encodes information from visual features and textual features.

At operation 1050, a visio-linguistic representation is composed based on a hierarchical aggregation of the first image-text embedding with the second image-text embedding. The visio-linguistic representation encodes a combination of visual and textual information at multiple levels of granularity.

At operation 1060, one or more target images are identified that include the visio-linguistic representation and the global text feature vector, so that the target image relates to the target image attribute. The target image is provided as the result of the image search. In some embodiments, the target image is identified by selecting the target image based on a distance between a composite feature vector (generated by fusing the visio-linguistic representation and the global text feature) and a corresponding composite feature vector associated with one or more potential target images, wherein the distance is calculated as a Euclidian distance or a cosine distance.

In some embodiments, additional operations are performed. For example, in some embodiments, the fusing comprises calculating a residual offset between the visio-linguistic representation and the global text feature vector and normalizing the residual offset.

In some embodiments, the first visual feature vector is generated as an output of a first group of layers of the image encoding CNN, the first group of layers including a convolutional layer, a batch normalization layer, and a max pooling layer. The second visual feature vector is generated as an output of a second group of layers of the image encoding CNN, the second group of layers in series with the first group of layers and including a convolutional layer, a batch normalization layer, and a max pooling layer.

In some embodiments, the first text feature vector is generated as an output of a first group of layers of the text encoding NN, the first group of layers including a first gated recurrent unit (GRU), a first fully connected (FC) layer, a second GRU, and a first linear projection. The second text feature vector is generated as an output of a second group of layers of the text encoding NN, the second group of layers including the first GRU, a second FC layer, the second GRU, and a second linear projection. The global text feature vector as an output of a third group of layers of the text encoding NN, the third group of layers including the first GRU, a third FC layer, the second GRU, and a third linear projection.

In some embodiments, a loss function is calculated for training of the first and second neural networks. The loss function is based on composite feature vectors generated from a training source image and a training text query associated with the training source image. The loss function is further based on visual feature vectors associated with a training target image and visual feature vectors associated with training non-target images.

Example Platform

Figure 11:
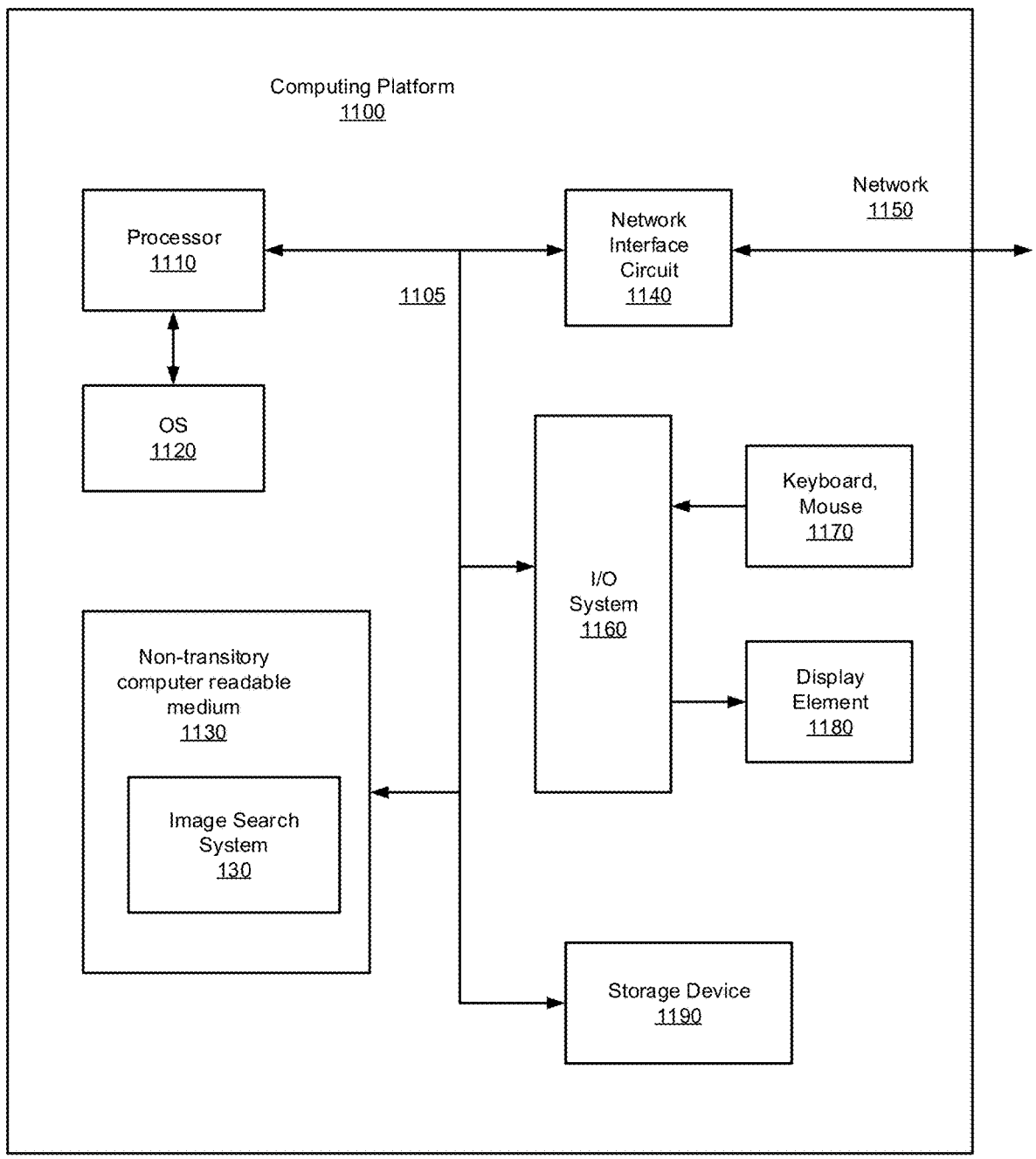
FIG. 11 is a block diagram schematically illustrating a computing platform configured to perform any of the techniques as variously described in this disclosure, configured in accordance with an embodiment of the present disclosure.

FIG. 11 is a block diagram schematically illustrating a computing platform 1100 configured to perform any of the techniques as variously described in this disclosure, configured in accordance with an embodiment of the present disclosure. For example, in some embodiments, the image search system 130 of FIG. 1, or any portions thereof as illustrated in FIGS. 2-6, 8, and 9, and the methodologies of FIG. 10, or any portions thereof, are implemented in the computing platform 1100. In some embodiments, the computing platform 1100 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 1100 includes one or more storage devices 1190 and/or non-transitory computer-readable media 1130 having encoded thereon one or more computer-executable instructions or software for implementing techniques as variously described in this disclosure. In some embodiments, the storage devices 1190 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1190 includes other types of memory as well, or combinations thereof. In one embodiment, the storage device 1190 is provided on the computing platform 1100. In another embodiment, the storage device 1190 is provided separately or remotely from the computing platform 1100. The non-transitory computer-readable media 1130 include, but are not limited to, one or more types of hardware memory, non-transitory tangible media (for example, one or more magnetic storage disks, one or more optical disks, one or more USB flash drives), and the like. In some embodiments, the non-transitory computer-readable media 1130 included in the computing platform 1100 store computer-readable and computer-executable instructions or software for implementing various embodiments. In one embodiment, the computer-readable media 1130 are provided on the computing platform 1100. In another embodiment, the computer-readable media 1130 are provided separately or remotely from the computing platform 1100.

The computing platform 1100 also includes at least one processor 1110 for executing computer-readable and computer-executable instructions or software stored in the storage device 1190 and/or non-transitory computer-readable media 1130 and other programs for controlling system hardware. In some embodiments, virtualization is employed in the computing platform 1100 so that infrastructure and resources in the computing platform 1100 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1105 is also provided to allow for communication between the various components listed above and/or other components not shown. Computing platform 1100 can be coupled to a network 1150 (e.g., a local or wide area network such as the internet), through network interface circuit 1140 to allow for communications with other computing devices, platforms, resources, clients, and Internet of Things (IoT) devices.

In some embodiments, a user interacts with the computing platform 1100 through an input/output system 1160 that interfaces with devices such as a keyboard and mouse 1170 and/or a display element (screen/monitor) 1180. The keyboard and mouse may be configured to provide a user interface to accept user input and guidance, and to otherwise control the image search system 130. The display element may be configured, for example, to display the results of the search using the disclosed techniques. In some embodiments, the computing platform 1100 includes other I/O devices (not shown) for receiving input from a user, for example, a pointing device or a touchpad, etc., or any suitable user interface. In some embodiments, the computing platform 1100 includes other suitable conventional I/O peripherals. The computing platform 1100 can include and/or be operatively coupled to various suitable devices for performing one or more of the aspects as variously described in this disclosure.

In some embodiments, the computing platform 1100 runs an operating system (OS) 1120, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1100 and performing the operations described in this disclosure. In one embodiment, the operating system runs on one or more cloud machine instances.

As will be appreciated in light of this disclosure, the various modules and components of the system, as shown in FIGS. 2-6, 8, and 9, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1100, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

FURTHER EXAMPLE EMBODIMENTS

Numerous example embodiments will be apparent, and features described herein can be combined in any number of configurations.

Example 1 is a method for image searching, the method comprising: decomposing, by a first neural network (NN), a source image into a first visual feature vector associated with a first level of granularity, and a second visual feature vector associated with a second level of granularity; decomposing, by a second NN, a text query into a first text feature vector associated with the first level of granularity, a second text feature vector associated with the second level of granularity, and a global text feature vector, wherein the text query defines a target image attribute and the global text feature vector spans multiple levels of granularity; generating, by a semantic feature transformation module, a first image-text embedding based on the first visual feature vector and the first text feature vector, and a second image-text embedding based on the second visual feature vector and the second text feature vector, wherein the image text embedding encodes information from visual features and textual features; composing, by a visio-linguistic composition module, a visio-linguistic representation based on a hierarchical aggregation of the first image-text embedding with the second image-text embedding, wherein the visio-linguistic representation encodes a combination of visual and textual information at multiple levels of granularity; and identifying, by a selection module, a target image that includes the visio-linguistic representation and the global text feature vector, so that the target image relates to the target image attribute, the target image to be provided as a result of the image search.

Example 2 includes the subject matter of Example 1, further comprising fusing, by the visio-linguistic composition module, the visio-linguistic representation and the global text feature vector to generate a composite feature vector, wherein the fusing comprises calculating a residual offset between the visio-linguistic representation and the global text feature vector and normalizing the residual offset.

Example 3 includes the subject matter of Examples 1 or 2, wherein identifying the target image includes selecting the target image based on a distance between the composite feature vector and a corresponding feature vector associated with one or more potential target images, wherein the distance is calculated as a Euclidian distance or a cosine distance.

Example 4 includes the subject matter of any of Examples 1-3, wherein: decomposing the source image includes extracting, by the first NN, the first visual feature vector of the source image and the second visual feature vector of the source image; and decomposing the text query includes extracting, by the second NN, the first text feature vector of the text query, the second text feature vector of the text query, and the global text feature vector of the text query.

Example 5 includes the subject matter of any of Examples 1-4, wherein the first NN is an image encoding convolutional NN (CNN) and the method further comprises: generating the first visual feature vector as an output of a first group of layers of the image encoding CNN, the first group of layers including a convolutional layer, a batch normalization layer, and a max pooling layer; and generating the second visual feature vector as an output of a second group of layers of the image encoding CNN, the second group of layers in series with the first group of layers and including a convolutional layer, a batch normalization layer, and a max pooling layer.

Example 6 includes the subject matter of any of Examples 1-5, wherein the second NN is a text encoding NN and the method further comprises: generating the first text feature vector as an output of a first group of layers of the text encoding NN, the first group of layers including a first gated recurrent unit (GRU), a first fully connected (FC) layer, a second GRU, and a first linear projection; generating the second text feature vector as an output of a second group of layers of the text encoding NN, the second group of layers including the first GRU, a second FC layer, the second GRU, and a second linear projection; and generating the global text feature vector as an output of a third group of layers of the text encoding NN, the third group of layers including the first GRU, a third FC layer, the second GRU, and a third linear projection.

Example 7 includes the subject matter of any of Examples 1-6, further comprising calculating, by a loss calculation module, a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

Example 8 is a system for image searching, the system comprising: one or more processors configured to receive a source image and a text query defining a target image attribute; a first neural network (NN) trained to decompose the source image into a first visual feature vector associated with a first level of granularity, and a second visual feature vector associated with a second level of granularity; a second NN trained to decompose the text query into a first text feature vector associated with the first level of granularity, a second text feature vector associated with the second level of granularity, and a global text feature vector, wherein the global text feature vector spans multiple levels of granularity; a semantic feature transformation module configured to generate a first image-text embedding based on the first visual feature vector and the first text feature vector, and a second image-text embedding based on the second visual feature vector and the second text feature vector, wherein the image text embedding encodes information from visual features and textual features; a visio-linguistic composition module configured to compose a visio-linguistic representation based on a hierarchical aggregation of the first image-text embedding with the second image-text embedding, wherein the visio-linguistic representation encodes a combination of visual and textual information at multiple levels of granularity; and a selection module configured to identify a target image that includes the visio-linguistic representation and the global text feature vector, so that the target image relates to the target image attribute, the target image to be provided as a result of the image search.

Example 9 includes the subject matter of Example 8, wherein the first NN is an image encoding convolutional NN (CNN) trained to: generate the first visual feature vector as an output of a first group of layers of the image encoding CNN, the first group of layers including a convolutional layer, a batch normalization layer, and a max pooling layer; and generate the second visual feature vector as an output of a second group of layers of the image encoding CNN, the second group of layers in series with the first group of layers and including a convolutional layer, a batch normalization layer, and a max pooling layer.

Example 10 includes the subject matter of Examples 8 or 9, wherein the second NN is a text encoding NN trained to: generate the first text feature vector as an output of a first group of layers of the text encoding NN, the first group of layers including a first gated recurrent unit (GRU), a first fully connected (FC) layer, a second GRU, and a first linear projection; generate the second text feature vector as an output of a second group of layers of the text encoding NN, the second group of layers including the first GRU, a second FC layer, the second GRU, and a second linear projection; and generate the global text feature vector as an output of a third group of layers of the text encoding NN, the third group of layers including the first GRU, a third FC layer, the second GRU, and a third linear projection.

Example 11 includes the subject matter of any of Examples 8-10, wherein the visio-linguistic composition module is further configured to fuse the visio-linguistic representation and the global text feature vector to generate a composite feature vector, wherein the fusing comprises calculating a residual offset between the visio-linguistic representation and the global text feature vector and normalizing the residual offset.

Example 12 includes the subject matter of any of Examples 8-11, wherein the selection module is further configured to select the target image based on a distance between the composite feature vector and a corresponding feature vector associated with one or more potential target images, wherein the distance is calculated as a Euclidian distance or a cosine distance.

Example 13 includes the subject matter of any of Examples 8-12, further comprising a loss calculation module configured to calculate a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

Example 14 is a computer program product including one or more non-transitory machine-readable mediums encoded with instructions that when executed by one or more processors cause a process to be carried out for image searching, the process comprising: receiving a source image and a text query defining a target image attribute; decomposing the source image into a first visual feature vector associated with a first level of granularity, and a second visual feature vector associated with a second level of granularity; decomposing the text query into a first text feature vector associated with the first level of granularity, a second text feature vector associated with the second level of granularity, and a global text feature vector, wherein the global text feature vector spans multiple levels of granularity; generating a first image-text embedding based on the first visual feature vector and the first text feature vector, and a second image-text embedding based on the second visual feature vector and the second text feature vector, wherein the image text embedding encodes information from visual features and textual features; composing a visio-linguistic representation based on a hierarchical aggregation of the first image-text embedding with the second image-text embedding, wherein the visio-linguistic representation encodes a combination of visual and textual information at multiple levels of granularity; and identifying a target image that includes the visio-linguistic representation and the global text feature vector, so that the target image relates to the target image attribute, the target image to be provided as a result of the image search.

Example 15 includes the subject matter of Example 14, wherein the process further comprises fusing the visio-linguistic representation and the global text feature vector to generate a composite feature vector, wherein the fusing comprises calculating a residual offset between the visio-linguistic representation and the global text feature vector and normalizing the residual offset.

Example 16 includes the subject matter of Examples 14 or 15, wherein identifying the target image includes selecting the target image based on a distance between the composite feature vector and a corresponding feature vector associated with one or more potential target images, wherein the distance is calculated as a Euclidian distance or a cosine distance.

Example 17 includes the subject matter of any of Examples 14-16, wherein: decomposing the source image includes extracting, by a first neural network (NN), the first visual feature vector of the source image and the second visual feature vector of the source image; and decomposing the text query includes extracting, by a second NN, the first text feature vector of the text query, the second text feature vector of the text query, and the global text feature vector of the text query.

Example 18 includes the subject matter of any of Examples 14-17, wherein the first NN is an image encoding convolutional NN (CNN) and the process further comprises: generating the first visual feature vector as an output of a first group of layers of the image encoding CNN, the first group of layers including a convolutional layer, a batch normalization layer, and a max pooling layer; and generating the second visual feature vector as an output of a second group of layers of the image encoding CNN, the second group of layers in series with the first group of layers and including a convolutional layer, a batch normalization layer, and a max pooling layer.

Example 19 includes the subject matter of any of Examples 14-18, wherein the second NN is a text encoding NN and the process further comprises: generating the first text feature vector as an output of a first group of layers of the text encoding NN, the first group of layers including a first gated recurrent unit (GRU), a first fully connected (FC) layer, a second GRU, and a first linear projection; generating the second text feature vector as an output of a second group of layers of the text encoding NN, the second group of layers including the first GRU, a second FC layer, the second GRU, and a second linear projection; and generating the global text feature vector as an output of a third group of layers of the text encoding NN, the third group of layers including the first GRU, a third FC layer, the second GRU, and a third linear projection.

Example 20 includes the subject matter of any of Examples 14-19, wherein the process further comprises calculating a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for performing an image search, the method comprising:
    decomposing, by a first neural network (NN), a source image into a first visual feature vector associated with a first level of granularity, and a second visual feature vector associated with a second level of granularity, wherein the source image includes visual features and textual features;
    decomposing, by a second NN, a text query into a first text feature vector associated with the first level of granularity, a second text feature vector associated with the second level of granularity, and a global text feature vector, wherein the text query defines a target image attribute and the global text feature vector spans multiple levels of granularity;
    generating, by a semantic feature transformation module, a first image-text embedding based on the first visual feature vector and the first text feature vector, and a second image-text embedding based on the second visual feature vector and the second text feature vector, wherein the first and second image-text embeddings each encode information from the visual features and the textual features;
    composing, by a visio-linguistic composition module, a visio-linguistic representation based on a hierarchical aggregation of the first image-text embedding with the second image-text embedding, wherein the visio-linguistic representation encodes a combination of visual and textual information at multiple levels of granularity; and
    identifying, by a selection module, a target image that includes the visio-linguistic representation and the global text feature vector, so that the target image relates to the target image attribute, the target image to be provided as a result of the image search.

2. The method of claim 1, further comprising fusing, by the visio-linguistic composition module, the visio-linguistic representation and the global text feature vector to generate a composite feature vector, wherein the fusing comprises calculating a residual offset between the visio-linguistic representation and the global text feature vector and normalizing the residual offset.

3. The method of claim 2, wherein identifying the target image includes selecting the target image based on a distance between the composite feature vector and a corresponding feature vector associated with one or more potential target images, wherein the distance is calculated as a Euclidian distance or a cosine distance.

4. The method of claim 1, wherein:
    decomposing the source image includes extracting, by the first NN, the first visual feature vector of the source image and the second visual feature vector of the source image; and
    decomposing the text query includes extracting, by the second NN, the first text feature vector of the text query, the second text feature vector of the text query, and the global text feature vector of the text query.

5. The method of claim 4, wherein the first NN is an image encoding convolutional NN (CNN) and the method further comprises:
generating the first visual feature vector as an output of a first group of layers of the image encoding CNN, the first group of layers including a convolutional layer, a batch normalization layer, and a max pooling layer; and
generating the second visual feature vector as an output of a second group of layers of the image encoding CNN, the second group of layers in series with the first group of layers and including a convolutional layer, a batch normalization layer, and a max pooling layer.

6. The method of claim 4, wherein the second NN is a text encoding NN and the method further comprises:
generating the first text feature vector as an output of a first group of layers of the text encoding NN, the first group of layers including a first gated recurrent unit (GRU), a first fully connected (FC) layer, a second GRU, and a first linear projection;
generating the second text feature vector as an output of a second group of layers of the text encoding NN, the second group of layers including the first GRU, a second FC layer, the second GRU, and a second linear projection; and
generating the global text feature vector as an output of a third group of layers of the text encoding NN, the third group of layers including the first GRU, a third FC layer, the second GRU, and a third linear projection.

7. The method of claim 4, further comprising calculating, by a loss calculation module, a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

8. A system for performing an image search, the system comprising:
one or more non-transitory computer readable media;
one or more processors configured to receive a source image and a text query defining a target image attribute, wherein the source image includes visual features and textual features;
a first neural network (NN) trained to decompose the source image into a first visual feature vector associated with a first level of granularity, and a second visual feature vector associated with a second level of granularity;
a second NN trained to decompose the text query into a first text feature vector associated with the first level of granularity, a second text feature vector associated with the second level of granularity, and a global text feature vector, wherein the global text feature vector spans multiple levels of granularity;
a semantic feature transformation module, encoded on the one or more non-transitory computer readable media, configured to generate a first image-text embedding based on the first visual feature vector and the first text feature vector, and a second image-text embedding based on the second visual feature vector and the second text feature vector, wherein the first and second image-text embeddings each encode information from the visual features and the textual features;
a visio-linguistic composition module, encoded on the one or more non-transitory computer readable media, configured to compose a visio-linguistic representation based on a hierarchical aggregation of the first image-text embedding with the second image-text embedding, wherein the visio-linguistic representation encodes a combination of visual and textual information at multiple levels of granularity; and
a selection module, encoded on the one or more non-transitory computer readable media, configured to identify a target image that includes the visio-linguistic representation and the global text feature vector, so that the target image relates to the target image attribute, the target image to be provided as a result of the image search.

9. The system of claim 8, wherein the first NN is an image encoding convolutional NN (CNN) trained to:
generate the first visual feature vector as an output of a first group of layers of the image encoding CNN, the first group of layers including a convolutional layer, a batch normalization layer, and a max pooling layer; and
generate the second visual feature vector as an output of a second group of layers of the image encoding CNN, the second group of layers in series with the first group of layers and including a convolutional layer, a batch normalization layer, and a max pooling layer.

10. The system of claim 8, wherein the second NN is a text encoding NN trained to:
generate the first text feature vector as an output of a first group of layers of the text encoding NN, the first group of layers including a first gated recurrent unit (GRU), a first fully connected (FC) layer, a second GRU, and a first linear projection;
generate the second text feature vector as an output of a second group of layers of the text encoding NN, the second group of layers including the first GRU, a second FC layer, the second GRU, and a second linear projection; and
generate the global text feature vector as an output of a third group of layers of the text encoding NN, the third group of layers including the first GRU, a third FC layer, the second GRU, and a third linear projection.

11. The system of claim 8, wherein the visio-linguistic composition module is further configured to fuse the visio-linguistic representation and the global text feature vector to generate a composite feature vector, wherein the fusing comprises calculating a residual offset between the visio-linguistic representation and the global text feature vector and normalizing the residual offset.

12. The system of claim 11, wherein the selection module is further configured to identify the target image based on a distance between the composite feature vector and a corresponding feature vector associated with one or more potential target images, wherein the distance is calculated as a Euclidian distance or a cosine distance.

13. The system of claim 8, further comprising a loss calculation module configured to calculate a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

14. A computer program product including one or more non-transitory machine-readable mediums encoded with instructions that when executed by one or more processors cause a process to be carried out for performing an image search, the process comprising:

receiving a source image and a text query defining a target image attribute, wherein the source image includes visual features and textual features;

decomposing the source image into a first visual feature vector associated with a first level of granularity, and a second visual feature vector associated with a second level of granularity;

decomposing the text query into a first text feature vector associated with the first level of granularity, a second text feature vector associated with the second level of granularity, and a global text feature vector, wherein the global text feature vector spans multiple levels of granularity;

generating a first image-text embedding based on the first visual feature vector and the first text feature vector, and a second image-text embedding based on the second visual feature vector and the second text feature vector, wherein the first and second image-text embeddings each encode information from the visual features and the textual features;

composing a visio-linguistic representation based on a hierarchical aggregation of the first image-text embedding with the second image-text embedding, wherein the visio-linguistic representation encodes a combination of visual and textual information at multiple levels of granularity; and identifying a target image that includes the visio-linguistic representation and the global text feature vector, so that the target image relates to the target image attribute, the target image to be provided as a result of the image search.

15. The computer program product of claim 14, wherein the process further comprises fusing the visio-linguistic representation and the global text feature vector to generate a composite feature vector, wherein the fusing comprises calculating a residual offset between the visio-linguistic representation and the global text feature vector and normalizing the residual offset.

16. The computer program product of claim 15, wherein identifying the target image includes selecting the target image based on a distance between the composite feature vector and a corresponding feature vector associated with one or more potential target images, wherein the distance is calculated as a Euclidian distance or a cosine distance.

17. The computer program product of claim 14, wherein:
decomposing the source image includes extracting, by a first neural network (NN), the first visual feature vector of the source image and the second visual feature vector of the source image; and decomposing the text query includes extracting, by a second NN, the first text feature vector of the text query, the second text feature vector of the text query, and the global text feature vector of the text query.

18. The computer program product of claim 17, wherein the first NN is an image encoding convolutional NN (CNN) and the process further comprises:
generating the first visual feature vector as an output of a first group of layers of the image encoding CNN, the first group of layers including a convolutional layer, a batch normalization layer, and a max pooling layer; and generating the second visual feature vector as an output of a second group of layers of the image encoding CNN, the second group of layers in series with the first group of layers and including a convolutional layer, a batch normalization layer, and a max pooling layer.

19. The computer program product of claim 17, wherein the second NN is a text encoding NN and the process further comprises:
generating the first text feature vector as an output of a first group of layers of the text encoding NN, the first group of layers including a first gated recurrent unit (GRU), a first fully connected (FC) layer, a second GRU, and a first linear projection;

generating the second text feature vector as an output of a second group of layers of the text encoding NN, the second group of layers including the first GRU, a second FC layer, the second GRU, and a second linear projection; and generating the global text feature vector as an output of a third group of layers of the text encoding NN, the third group of layers including the first GRU, a third FC layer, the second GRU, and a third linear projection.

20. The computer program product of claim 17, wherein the process further comprises calculating a loss function for training of the first NN and the second NN, the loss function based on composite feature vectors generated from a training source image and a training text query associated with the training source image, wherein the loss function is further based on visual feature vectors associated with a training target image and visual feature vectors associated with training non-target images.

* * * * *

UNITED STATES PATENT AND TRADEMARK OFFICE
CERTIFICATE OF CORRECTION

| | |
|---|---|
| PATENT NO. | : 11,720,651 B2 |
| APPLICATION NO. | : 17/160893 |
| DATED | : August 8, 2023 |
| INVENTOR(S) | : Pinkesh Badjatiya et al. |

It is certified that error appears in the above-identified patent and that said Letters Patent is hereby corrected as shown below:

On the Title Page

Item (72):
Please replace "Ujain" with --Ujjain--.

Signed and Sealed this
Nineteenth Day of September, 2023

Katherine Kelly Vidal
*Director of the United States Patent and Trademark Office*